UNITED STATES PATENT OFFICE.

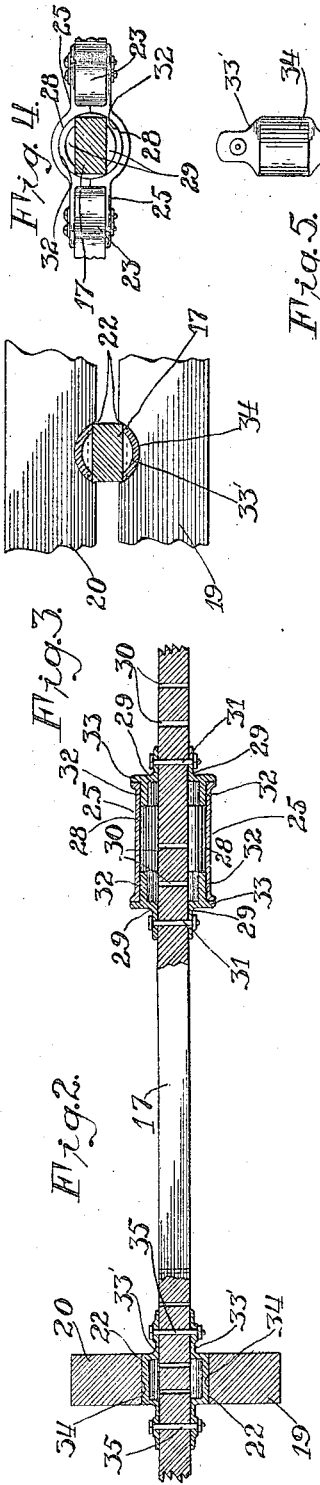

JAMES A. MOXEY, OF CHICAGO, ILLINOIS, ASSIGNOR TO INTERNATIONAL HARVESTER COMPANY, A CORPORATION OF NEW JERSEY.

WAGON REACH BAR.

1,419,291.  Specification of Letters Patent.  Patented June 13, 1922.

Application filed April 30, 1919. Serial No. 293,759.

*To all whom it may concern:*

Be it known that I, JAMES A. MOXEY, a citizen of the United States, residing at Chicago, in the county of Cook and State of Illinois, have invented certain new and useful Improvements in Wagon Reach Bars, of which the following is a full, clear, and exact specification.

This invention relates to wagon running gears, and more particularly to improvements in the construction of reach bars which form part of the running gear.

Probably the commonest and least expensive form of reach bar is the square wooden reach, and while this form of bar is satisfactory in localities where the roads are level and in good condition, when the wagon is used on rough and mountainous roads, this form of bar has not proved satisfactory. This is due to the fact that the rear axle of the wagon often tilts with respect to the wagon body and the front axle, when one of the wheels sinks into a rut. This tilting of the axle twists the reach bar and places it under a severe torsional strain and if a heavy load is being transported, breakage of the reach bar is almost inevitable. For the above reason round reach bars have come into use, but the usual form of round reach bar is much more expensive to manufacture than is the square reach.

The present invention was devised to overcome the above noted difficulties, and this invention has for its object to provide a practical and inexpensive reach bar that will have all of the advantages of the round reach bar but will be less expensive to manufacture and will require less material than the usual type of round reach bar.

A further object is to provide a reach bar that would be adapted for use with different sizes of hound plates.

A still further and more specific object is to provide a simple and practical means for modifying a square reach bar in such a manner that it will perform the functions of a round reach bar, and moreover, a construction that will be adjustable in a manner to adapt it to different sizes of reach bars and hound plates.

One embodiment of the invention is illustrated in the accompanying drawings, and in these drawings,—

Figure 1 illustrates a top plan view of the running gear of a wagon with my improved reach bar construction thereon;

Fig. 2 is a longitudinal section of the rear truck and reach bar taken on the line 2—2 of Fig. 1;

Fig. 3 is a transverse sectional view taken across the reach bar at the rear axle;

Fig. 4 is a transverse sectional view of the reach bar taken adjacent the hound plates; and Figs. 5 and 6 illustrate in top plan view and end elevation the construction of the bearing members secured to the reach bar adjacent its rear end and cooperating with the rear axle and bolster.

The wagon truck with which my improved reach bar construction is used may be of any of the desired constructions, and in Fig. 1, I have illustrated in plan view the front truck 10, and rear truck 11, of a wagon. The front truck is provided with the usual hounds 12, bolster 13, tongue 14, and supporting wheels 15, a fifth wheel 16 being provided between the front axle and bolster. The reach bar 17 is secured in any suitable manner as by king pin 18 to the front truck and extends rearwardly through the rear truck of the wagon. The rear truck is also of standard construction and includes an axle 19 and bolster 20. The axle 19 is supported by the usual carrying wheels 21 and the axle and bolster are provided with oppositely disposed substantially semi-circular recesses 22. Hounds 23 are connected at their rear ends by clamping members 24 to the axle 19 and bolster 20, and are connected at their front ends by hound plates 25. The hounds are also connected to the axle by brace arms 26 and to the bolster by brace rods 27. The hound plates 25 are provided with oppositely disposed semi-circular bearing surfaces 28 which coact to form a cylindrical bearing for the reach bar.

In order to adapt the square reach bar 17 for use in connection with the cylindrical bearings, the portion of the reach bar cooperating with the hound plates is provided with a plurality of adjustably mounted bearing members 29. The reach bar is provided adjacent the front ends of the hounds with a plurality of transverse apertures 30 and the bearing members 29 are secured by means of bolts 31 to the reach bar in any desired position, the bolts passing through the apertures 30. The distance between the bearing members 29 will be determined by the size of the hound plates.

From the showing in Fig. 2 it will be clear that two sets of bearing members are employed, each set comprising two members, an upper member and a lower member. Each bearing member is substantially semicircular in outline and has a longitudinally extending cylindrical bearing surface 32 and an outwardly extending flange 33. The bearing surfaces 32 coact with the bearing surfaces of the hound plates and the flanges 33 cooperate with the ends of the hound plates and provide the draft connection between the rear truck and the reach bar. By forming the bearing members for the reach bar of a plurality of sets of relatively adjustable bearing members I have provided for different sizes of hound plates and also for a slight difference in the thickness of the reach bars, the bearing members of each set being adjustable toward and from each other.

In order to adapt the square reach bar for cooperation with the semi-circular bearing surfaces 22 formed in the rear axle and bolster, I have provided a pair of bearing members 33' which are secured to the reach bar on its upper and lower surfaces in a position to coact with these bearing surfaces. The bearing members 33' are provided on their outer surfaces with cylindrical bearing surfaces 34 and these members are secured to the reach bar by means of bolts 35. If desired, a plurality of bolt holes may be provided for bolts 35, thereby permitting a range of adjustment for members 33'.

From the above description it will be seen that a simple, practical and inexpensive construction has been provided for adapting a square reach bar for use in connection with cylindrical bearing surfaces, thereby permitting the rear truck of a wagon to tilt with respect to the front truck, thus eliminating the danger of breakage of the reach bar.

In view of the simplicity of the construction it is believed that a detailed description of the operation is unnecessary, since applicant has in the specification described how the various parts of the structure are assembled.

While I have in the above specification described one specific embodiment of my invention, I realize that the construction may be modified in various ways without departing from the spirit and scope of the invention as expressed in the following claims, therefore I do not wish to be limited to the exact construction illustrated.

1. A swivel bearing for wagons comprising the combination with a rear truck and a rectangular reach bar of a cylindrical bearing sleeve secured on the truck and a set of arcuate journal plates positioned on opposite faces of the reach bar in cooperative relation to the sleeve and formed with integral radial flanges engaging the ends of the sleeve and with outward extensions lying against opposite faces of the reach bar, said extensions and the reach bar having perforations for reception of fastening means.

2. In a running gear for wagons, a truck including an axle, bolster, and hounds secured to said axle and bolster, hound plates connecting said hounds, said hound plates forming a substantially cylindrical bearing, a reach bar rectangular in cross section, and a plurality of sets of relatively adjustable bearing members carried by said reach bar and cooperating with the cylindrical bearing formed by said hound plates.

3. In a running gear for wagons, a truck including an axle, bolster, and hounds secured to said axle, said axle and bolster being provided respectively with recessed portions forming a substantially circular bearing therebetween, hound plates connecting said hounds and having a substantially cylindrical bearing portion, a reach bar, a plurality of sets of bearing plates adjustably secured to said reach bar and engaging a bearing portion of said hound plates, and bearing members carried by said reach bar and coacting with the bearing surfaces formed on said axle and bolster.

In testimony whereof I affix my signature.

JAMES A. MOXEY.